United States Patent [19]
Wu et al.

[11] Patent Number: 6,136,875
[45] Date of Patent: *Oct. 24, 2000

[54] HIGH PRODUCTIVITY, LOW FUGITIVE EMISSION FOAMS AND FOAM PROCESSES

[75] Inventors: Wen Pao Wu, Pittsford; Gary A. Francis, Canandaigua, both of N.Y.

[73] Assignee: Tenneco Packaging, Inc., Lake Forest, Ill.

[*] Notice: This patent is subject to a terminal disclaimer.

[21] Appl. No.: 09/276,332

[22] Filed: Mar. 25, 1999

Related U.S. Application Data

[63] Continuation-in-part of application No. 08/941,960, Oct. 1, 1997, Pat. No. 5,939,463.

[51] Int. Cl.⁷ ...................................................... C08J 9/04
[52] U.S. Cl. ................... 521/97; 521/79; 521/98; 521/131; 521/133; 521/146; 252/67; 252/69
[58] Field of Search .................... 521/79, 97, 98, 521/131, 133, 146; 252/67, 69

[56] References Cited

U.S. PATENT DOCUMENTS

| | | | |
|---|---|---|---|
| 3,431,164 | 3/1969 | Gilbert | 161/161 |
| 4,198,363 | 4/1980 | Noel | 264/45.9 |
| 4,344,710 | 8/1982 | Johnson et al. | 366/76 |
| 4,424,287 | 1/1984 | Johnson et al. | 521/74 |
| 4,470,938 | 9/1984 | Johnson | 264/50 |
| 4,485,059 | 11/1984 | Krutchen et al. | 264/51 |
| 4,528,221 | 7/1985 | Komatsuzaki et al. | 428/35 |
| 4,956,395 | 9/1990 | Leduc | 521/79 |
| 5,286,429 | 2/1994 | Blythe et al. | 264/51 |
| 5,356,944 | 10/1994 | Blythe et al. | 521/146 |
| 5,453,454 | 9/1995 | Alicke et al. | 521/79 |
| 5,562,857 | 10/1996 | Werner et al. | 252/67 |
| 5,576,094 | 11/1996 | Callens et al. | 428/220 |
| 5,672,294 | 9/1997 | Lund et al. | 252/67 |
| 5,939,463 | 8/1999 | Wu et al. | 521/97 |

FOREIGN PATENT DOCUMENTS

52724/79  5/1980  Australia.

OTHER PUBLICATIONS

"General Purpose Polystyrene," *Encyclopedia of Polymer Science and Engineering*, J. Wiley & Sons, 2nd Edition, vol. 16, pp. 62–71 (1989).

Krutchen et al., "Gas Chromatographic Determination Of Residual Blowing Agents In Polystyrene Foams," *Proceeding SPE ANTEC '88*, pp. 704–706 (1988).

Zwolinski et al., Extruded Polystyrene Foam With CFC/Carbon Dioxide Blowing Agents, *ANTEC 1986*, pp. 30–33 (1986).

*Primary Examiner*—John M. Cooney, Jr.
*Attorney, Agent, or Firm*—Jenkens & Gilchrist

[57] ABSTRACT

A blowing agent for foaming polystyrene consisting essentially of at least one low permeability compound (preferably a volatile organic compound (VOC)), at least one low volatility compound (preferably a non-VOC) and, optionally, at least one high volatility compound (preferably a non-VOC). In one embodiment, the low permeability volatile organic compound is selected from the group consisting of isopentane and isobutane, the low volatility non-volatile organic compound is acetone and the high volatility non-volatile organic compound is carbon dioxide. The blowing agent of the present invention may be used to foam a polystyrene foam structure. The blowing agent is directed to achieving low fugitive VOC emissions.

54 Claims, 1 Drawing Sheet

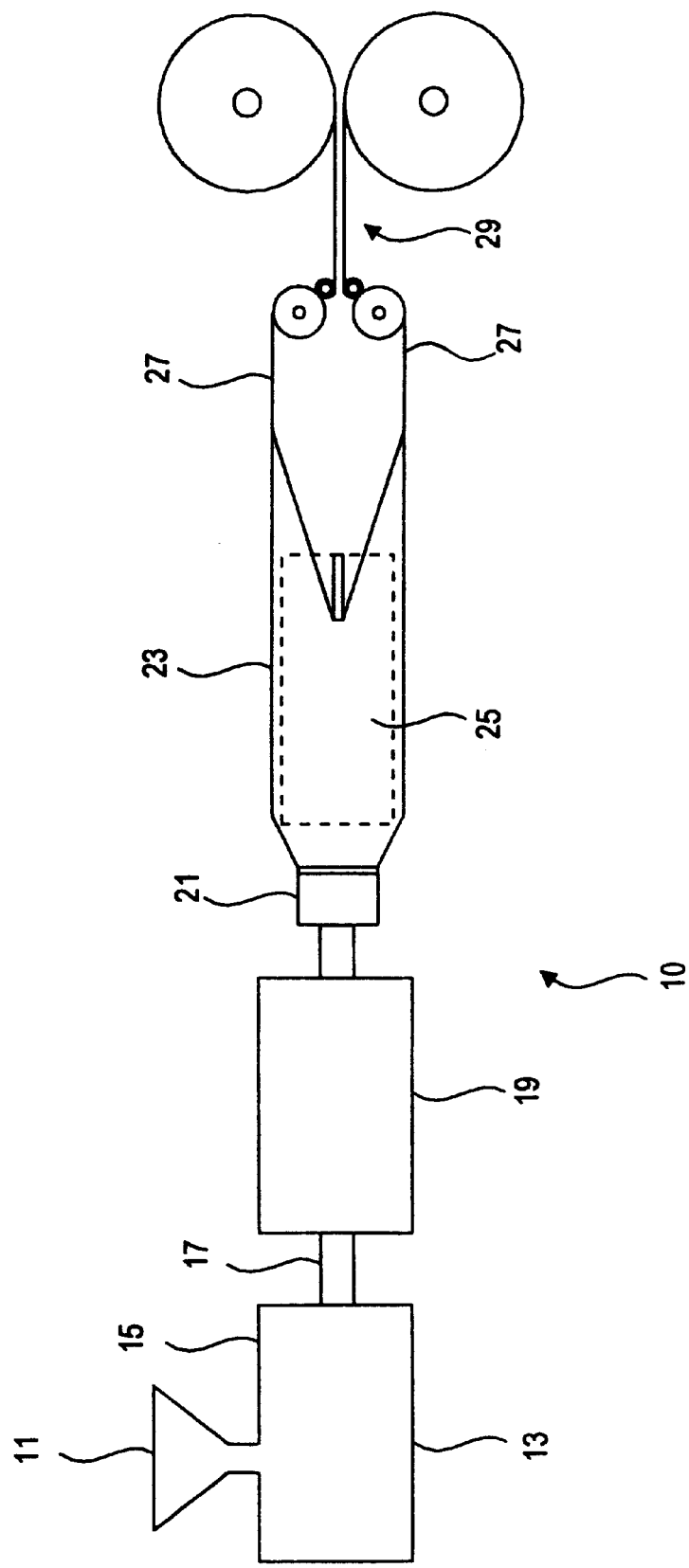

HIGH PRODUCTIVITY, LOW FUGITIVE EMISSION FOAMS AND FOAM PROCESSES

RELATED APPLICATION

This application is a continuation-in-part of U.S. patent application Ser. No. 08/941,960, filed Oct. 1, 1997, now allowed U.S. Pat. No. 5,939,463.

FIELD OF INVENTION

The present invention is directed to a foam process where low fugitive volatile organic compound (VOC) emissions are achieved by employing a blowing agent. Specifically, the blowing agent comprises at least one low permeability blowing agent (preferably a VOC blowing agent), at least one low volatility blowing agent (preferably a non-VOC blowing agent) and, optionally, at least one high volatility blowing agent (preferably a non-VOC blowing agent).

BACKGROUND OF THE INVENTION

Foam, such as polystyrene foam, is commonly made by combining a physical blowing agent with molten polystyrene resin under pressure and, after thorough mixing, extruding the combination through an appropriate die into a lower pressure atmosphere.

From about the 1950's to the present, physical blowing agents of choice have been halocarbons, hydrocarbons, or combinations thereof. Examples of these include commercially available halocarbon compositions, such as dichlorodifluoromethane and trichlorofluoromethane, and the $C_4$–$C_6$ hydrocarbons. These physical blowing agents, however, have various disadvantages. For example, physical blowing agents are released into the atmosphere during and after foam production and, thus, are a source of pollution. In addition, the hydrocarbon blowing agents constitute a fire hazard.

In the past, carbon dioxide has been experimented with as a blowing agent for resins, such as polystyrene resins. Carbon dioxide has been listed as a blowing agent or as a co-blowing agent in the following: U.S. Pat. No. 3,431,164 to Gilbert et al., U.S. Pat. No. 4,198,363 to Noel, and U.S. Pat. No. 4,470,938 to Johnson. Carbon dioxide has a disadvantage of a very high foaming rate caused by its high volatility. A very high foaming rate results in a high degree of corrugation in the extruded sheet. Because of the high degree of corrugation, a lower amount of blowing agent is used as compared to using a conventional hydrocarbon or halocarbon blowing agent. When a lower amount of blowing agent is used, higher viscosities and a lower output rate are obtained.

Carbon dioxide has been used as a co-blowing agent or a diluent for hydrocarbon or halocarbon blowing agents. This is illustrated, for example, in U.S. Pat. No. 4,344,710 to Johnson et al., and in an article by L. M. Zwolinski and F. J. Dwyer, "Extruded Polystyrene Foam With CFC/Carbon Dioxide Blowing Agents," ANTEC '86, pages 30–33, Conference Proceedings, Society of Plastic Engineers 44th Annual Technical Conference and Exhibit. Because of the high volatility of carbon dioxide, it can only be substituted at a low level in the process. Thus, the use of carbon dioxide as a co-blowing agent with hydrocarbon or halocarbon blowing agents still results in a significant amount of process emission that is a source of pollution.

Therefore, a need exists for a foam process which greatly reduces fugitive VOC emissions by reducing the concentration of the low permeability blowing agent (preferably a VOC blowing agent) employed, while still maintaining a same extrusion output rate as a conventional process using primarily a hydrocarbon or halocarbon blowing agent.

SUMMARY OF THE INVENTION

The blowing agents of the present invention include at least one low volatility blowing agent (preferably a non-VOC blowing agent) with at least one low permeability blowing agent (preferably a VOC blowing agent). Alternatively, at least one high volatility blowing agent (preferably a non-VOC blowing agent) may be added to the low volatility blowing agent (preferably a non-VOC blowing agent) and the low permeability blowing agent (preferably a VOC blowing agent). The term VOC, as used herein, is defined by the Environmental Protection Agency (EPA) as any compound of carbon, excluding carbon monoxide, carbon dioxide, carbonic acid, metallic carbides or carbonates, and ammonium carbonate, which participates in atmospheric photochemical reactions. This definition of VOC, including a list of excluded VOCs, is illustrated, for example, in "Proposed Rules Of The Environmental Protection Agency" by Carol M. Browner in the Federal Register at Vol. 62, No. 164, on Aug. 25, 1997, which is incorporated herein by reference in its entirety.

In one embodiment, the low volatility non-VOC blowing agent is acetone, the low permeability VOC blowing agent is a hydrocarbon (such as isopentane) or a halocarbon, and the high volatility non-VOC blowing agent is carbon dioxide.

The blowing agent of the present invention may be used with polystyrene to form a polystyrene foam structure.

BRIEF DESCRIPTION OF THE DRAWINGS

Other objects and advantages of the invention will become apparent upon reading the following detailed description and upon reference to the drawings.

FIGURE is a schematic flow diagram of an overall sequence of operations according to one embodiment involved in the manufacture of a foamed polystyrene sheet with the blowing agents of the present invention.

While the invention is susceptible to various modifications and alternative forms, a specific embodiment thereof has been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

The foam process of the present invention employs a blowing agent to achieve low fugitive VOC emissions. The blowing agent comprises at least one low permeability blowing agent (preferably a VOC blowing agent), at least one low volatility blowing agent (preferably a non-VOC blowing agent) and, optionally, at least one high volatility blowing agent (preferably a non-VOC blowing agent).

Of the thermoplastic resins which can be foamed in accordance with the present invention, the styrene homopolymers and copolymers containing a predominant portion of styrene, i.e., greater than about 50 wt % styrene, are preferred, with those containing greater than about 75 wt % styrene being especially preferred. With respect to a styrene copolymer, the comonomer can be any other ethylenically unsaturated material such as the conjugated 1,3-dienes, e.g., butadiene, isoprene, etc., alpha-beta-unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of a styrene polymer with other polymers can be employed, e.g., blends of a styrene polymer with polyphenylene oxide. In any of the foregoing polymers, all or a portion of the styrene can be replaced with one or more closely related homologues of styrene such as alpha-methylstyrene, o-, m-, and p-methylstyrene, o-, m-, p-ethylstyrene, 2,4-dimethylstyrene, etc.

In the present invention, at least one of the VOC blowing agents exhibits low permeability in the polymer being foamed. A low permeability blowing agent is defined as having a permeability lower than about $1 \times 10^{-12}$ cc(STP)(cm)/[(sec)(cm$^2$)(cmHg)] and preferably lower than about $5 \times 10^{-13}$ cc(STP)(cm)/[(sec)(cm$^2$)(cmHg)]. In the case of polystyrene, the preferred low permeability VOC blowing agents are cyclopentane, isopentane, isobutane, 2-2 dimethyl butane, cyclohexane, and mixtures thereof.

The addition of at least one low volatility blowing agent (preferably a non-VOC blowing agent) further reduces the viscosity of the melt to the same degree as the hydrocarbon VOC blowing agent originally employed. A low volatility blowing agent is defined as having a boiling point higher than ambient temperature, e.g., about 23° C., and preferably having a boiling point greater than about 40° C. One example of a low volatility non-VOC blowing agent that may be used in the present invention is acetone. In addition, acetone may be combined with water to comprise a low volatility non-VOC blowing agent. Another example of a potential low volatility non-VOC is methyl acetate. Methyl acetate was classified as a VOC blowing agent by the Environmental Protection Agency (EPA), but since has been reclassified as a non-VOC blowing agent following a proposal to the Environmental Protection Agency (EPA). It is contemplated that methyl acetate may be mixed or co-injected with acetone or an acetone/water mixture.

One example of a high volatility non-VOC blowing agent in the present invention is carbon dioxide ($CO_2$). In one embodiment of the present invention, carbon dioxide is in the liquid state before injection into the extruder. Carbon dioxide in gaseous state or supercritical fluid state may, however, also be used in the present invention. It is contemplated that other high volatility non-VOC blowing agents like nitrogen, ethane, and hydrofluorocarbons, such as HFC-152a and HFC-134a, may be employed. It is additionally contemplated that the above high volatility non-VOC blowing agents may be mixed. A high volatility blowing agent is defined as having a boiling point below about 0° C., and preferably below about −20° C.

The total amount of blowing agent used will depend on conditions such as extrusion process conditions at mixing, the composition of the extrudate, and the desired density of the foamed sheet. The remainder of the foamed sheet density is comprised of a thermoplastic resin and any additives that may be used including, but not limited to, foaming additives and colorants. For a foamed sheet density of from about 1 to about 15 lb/ft$^3$, typically the total weight percentage of the blowing agent will be from about 2 to about 10 wt % of the extrudate. The extrudate is defined as including a blowing agent, a polystyrene or the like, and any additives, colorants, etc. The preferred range is from about 2 to about 8 wt % blowing agent, and more preferably from about 2 to about 6 wt % blowing agent of the extrudate.

Specifically, the low permeability blowing agent (preferably a VOC blowing agent) generally comprises from about 0.5 to about 5 wt %, and preferably from about 1 to about 3 wt % of the extrudate. The low volatility blowing agent (preferably a non-VOC blowing agent) generally comprises from about 0.25 to about 5 wt %, and 20 preferably from about 0.5 to about 3 wt % of the extrudate. The optional high volatility blowing agent (preferably a non-VOC blowing agent) generally comprises from about 0.25 to about 5 wt %, and preferably from about 0.5 to about 3 wt % of the extrudate. It is preferred that the amount of the high volatility blowing agent (preferably a non-VOC blowing agent) be maintained at a certain amount in the system to achieve better final sheet density control.

The low permeability compound generally comprises less than about 70 wt % of the blowing agent and may be less than about 60 wt % of blowing agent. The weight percent of the low permeability compound may be less than about 80 wt % if a high volatility compound is not used. The low permeability compound may also comprise less than about 50 wt % of the blowing agent. The low permeability compound generally comprises greater than about 10 wt % of the blowing agent and typically comprises greater than about 20 wt % of the blowing agent. The low volatility compound generally comprises greater than about 10 or about 15 wt % of the blowing agent and typically comprises greater than about 20 wt % of the blowing agent. The low volatility compound may be greater than about 30 wt % of the blowing agent. The low volatility compound generally comprises less than about 70 wt % of the blowing agent and typically is less than about 60 wt % of the blowing agent. The low volatility compound may comprise less than about 50 wt % of the blowing agent. The optional high volatility compound is generally less than about 30 wt % of the blowing agent and is typically less than about 15 wt % of the blowing agent.

A nucleating agent or combination of such agents may be employed in the present invention for advantages, such as their capability for regulating cell formation and morphology. Known nucleating agents, such as talc, mixtures of sodium bicarbonate and citric acid, and the like, may be employed in the present invention.

If desired, fillers, colorants, light and heat stabilizers, plasticizers, chemical blowing agents, foaming additives, and plastic compounding agents can be included in the foamable resin compositions.

A conventional two extruder tandem system may be used for extruding the foam sheet of the present invention. A single extruder with proper cooling may also be employed.

For example, polystyrene resin pellets are admixed with a nucleating agent, such as talc. These materials are continuously fed into a hopper of a 4½ inch diameter screw primary extruder. The feed mixture is conveyed forward by the helical screw within a barrel of the extruder as the mixture is mixed, compressed, heated, and converted to molten form. The conversion to molten form occurs prior to reaching the injection zone where the blowing agent is added. The blowing agent of the present invention is injected into the polystyrene composition at a point where the polystyrene is in a molten condition (i.e., beyond the feed zone).

After injecting the blowing agent, the mixture is continuously mixed in the primary extruder at pressure high enough to ensure a homogeneous solution of the resin and the blowing agent mixture. The molten mixture is then conveyed into a cooled secondary extruder where the mixture is passed along the length of the secondary extruder at low shear. During this time, the molten mixture is cooled and additional mixing takes place. The mixture is then extruded through a die into a lower pressure zone, such as ambient pressure.

It is desirable that the melt temperature of the polymer entering the die be educed to a relatively low value. This lower melt temperature of the polymer entering the die produces a foam sheet with an improved property balance between the machine direction (MD) and the transverse direction (TD).

With reference to the FIGURE, a two extruder tandem system 10 may be used for extruding the foam sheet of the present invention. Polystyrene resin pellets are mixed with additive(s), including a nucleating agent, to form a feed mixture which is fed continuously into a hopper 11 of a 4½ inch diameter screw primary extruder 13. The feed mixture is conveyed forward by a helical screw within a barrel of the extruder as the feed mixture is mixed, compressed, heated and melted prior to reaching the injection zone for adding a blowing agent. The blowing agent is added at point 15. Thus, the blowing agent of the present invention is injected into the polystyrene/additives mixture (feed mixture) at a point beyond the feed zone where the polystyrene is melted.

Following injection of the blowing agent, the mixture is continuously mixed in the primary extruder 13 and subsequently passed, at a high enough pressure that the blowing agents remain in solution, through a hollow adapter section 17 into a cooled 6 inch diameter secondary tandem extruder 19. The molten mixture is passed along the length of the cooled secondary extruder at low shear where cooling and additional mixing occur. The mixture is then expressed through an annular die 21. The foamable polystyrene polymer is extruded through the annular die 21 in the form of an elongated bubble or tube 23, which is expanded and drawn over a cylindrical surface of a cooling and sizing drum 25 and slit to form sheet stock 27. The sheet stock 27 is taken up on one or more winding reels 29.

In the FIGURE, a thermoplastic resin, e.g., a polystyrene homopolymer, containing a nucleating agent, such as talc, is introduced into the primary extruder 13. The primary extruder 13 melts the mixture and then combines the mixture with the blowing agent of the present invention under pressure. The operating conditions of the primary extruder 13, for example, include an extruder exit pressure of from about 1000 to about 10,000 psi, and preferably from about 2,000 to about 5,000 psi. The temperature of the primary extruder 13 ranges from about 380 to about 550° F., and preferably from about 420 to about 500° F.

The extrudate from the primary extruder 13 is, thereafter, introduced to the secondary extruder 19. The operating conditions of the secondary extruder 19, for example, include an extruder exit pressure of from about 1,000 to about 6,000 psi, and preferably from about 1,500 to about 3,500 psi. The temperature of the extrudate from the secondary extruder 19 can range from about 200 to about 360° F., and preferably from about 250 to about 340° F.

The foam sheet resulting from the foam tube, extruded in accordance with the invention, can vary from about 0.03 to about 1.0 inch or more in thickness, e.g., from about 0.03 to about 0.5 inch in thickness. The resulting foam sheet has a density of from about 1 to about 15 lb/ft$^3$, e.g., from about 2.0 to about 9.0 lb/ft$^3$. When the foam sheet is extruded to a thickness of from about 0.25 to about 0.50 inch or more, it is suitable for use as an insulation board.

EXAMPLES

The blowing agents were tested with the results shown in Tables 1 and 2. Inventive Foams 2-5 in Table 1 were comprised of various amounts of a low permeability VOC blowing agent (isopentane), a high volatility non-VOC blowing agent ($CO_2$), and a low volatility non-VOC blowing agent (acetone). Comparative Foam 1 in Table 1 comprised a low permeability VOC blowing agent (isopentane) and a high volatility non-VOC blowing agent ($CO_2$) without a low volatility non-VOC blowing agent.

In producing Comparative Foam 1, high heat general purpose polystyrene (GPPS) was melted in a 2½ inch extruder. The blowing agents (isopentane and carbon dioxide) were injected into a first extruder at a point after a first metering zone of the first extruder. The polystyrene/ blowing agent mixture was then homogenized in the remainder of the first extruder. This mixture was then conveyed through a second extruder and cooled to about 300° F., after which it was extruded through an annular die to make a closed cell polystyrene foam at a rate of 139 lb/hr. The input amount of isopentane was controlled to 4.2 wt % of the extrudate. Similarly, the input amount of carbon dioxide was controlled to 0.5 wt % of the extrudate. The sheet of Comparative Foam 1 had an extruded density of 3.8 lb/ft$^3$, which is considered typical for polystyrene food packaging foam.

The sheet of Comparative Foam 1 aged for 7 days, after which parts were formed having a final density of 2.2 lb/ft$^3$. The amount of isopentane remaining in the foam parts was measured at regular intervals using gas chromatography. The measurements were made in accordance with the procedure set forth in the article entitled "Gas Chromatographic Determination Of Residual Blowing Agents In Polystyrene Foams" to C. M. Krutchen and W. P. Wu, Proceeding SPE ANTEC '88, pages 704–706 (1988). The amount of isopentane remaining in the foam parts 28 days after extrusion was 2.98%. The difference between the 4.2% input and the 2.98% retained isopentane (1.22%) was the blowing agent loss to the atmosphere.

Inventive Foams 2–5 were made under similar conditions, except for the specific amounts of isopentane and carbon dioxide. In addition, Inventive Foams 2–5 included acetone in the blowing agent mixture.

Referring to Inventive Foams 2–5, the weight percent of the isopentane was in the range of from 0.8 to 1.88 wt %, the weight percent of the acetone was in the range of from 1.88 to 3.1 wt %, and the weight percent of the carbon dioxide was in the range from 0.60 to 0.73 wt %. The above weight percentages were based on the extrudate. The remainder of the feed mixture comprised a high heat general purpose polystyrene.

Referring to Table 1, Inventive Foams 2–5 showed improvement in the blowing agent loss in 30 days over Comparative Foam 1. Specifically, when the isopentane level was reduced to about 1 to about 2 wt %, very little permeated out of the foam sheet after an extended period of time (see blowing agent loss in 30 days in Inventive Foams 2–5). Thus, Inventive Foams 2–5 exhibited low VOC emissions. Additionally, the blowing agents of Inventive Foams 2–5 had an equal or better extrusion rate than Comparative Foam 1 (see rate in lb/hr in Table 1).

TABLE 1

| Test | Comparative Foam #1 | Inventive Foam #2 | Inventive Foam #3 | Inventive Foam #4 | Inventive Foam #5 |
|---|---|---|---|---|---|
| Isopentane (wt %) | 4.2% | 1.88% | 1.47% | 1.07% | 0.80% |
| Acetone (wt %) | 0% | 1.88% | 2.21% | 2.76% | 3.1% |
| $CO_2$ (wt %) | 0.50% | 0.73% | 0.69% | 0.72% | 0.60% |
| Rate (lb/hr) | 139 | 146 | 151 | 147 | 142 |
| Part Density (lb/ft$^3$) | 2.22 | 3.13 | 2.50 | 2.72 | 2.83 |
| VOC blowing agent loss (wt % in 28–30 days) | 1.22% | 0.18% | 0.02% | 0.14% | 0.03% |

Referring to Table 2, Foams 6–11 were produced in a similar manner as described above with respect to Foams 1–5. The extruder used for producing Foams 1–5 was modified to enable Foams 6–11 to be made at a higher rate (lb/hr) than that of Foams 1–5. Foams 6–11 were extruded through an annular die to make a polystyrene foam at a rate of about 191 lb/hr. The sheets of Foams 6–11 were made under similar conditions, except for the specific amounts of isopentane and carbon dioxide as blowing agents. In addition, Foams 7–11 included acetone in the blowing agent mixture.

Referring to Foams 7–11, the weight percent of the isopentane ranged from 1.75 to 3.80 wt %, the weight percent of the acetone ranged from 0.38 to 2.03 wt %, and the weight percent of the carbon dioxide ranged from 0.57 to 0.69 wt % of the extrudate. The remainder of the feed mixture comprised a high heat general purpose polystyrene.

Referring still to Table 2, Foams 8–11 showed improvement in the blowing agent loss in 29 days over Foams 6 and 7. Specifically, when the isopentane level was from about 1.75 to about 3.25 wt %, very little permeated out of the foam sheet after an extended period of time (see blowing agent loss in 29 days in Foams 8–11). Thus, Foams 8–11 exhibited less emissions as compared to Foams 6 and 7. Additionally, the blowing agents of Foams 8–11 had a similar extrusion rate (about 191 lb/hr) as Foams 6 and 7 as shown in Table 2.

TABLE 2

| Test | Foam 6 | Foam 7 | Foam 8 | Foam 9 | Foam 10 | Foam 11 |
|---|---|---|---|---|---|---|
| Isopentane (wt %) | 4.22 | 3.80 | 3.25 | 2.77 | 2.26 | 1.75 |
| Acetone (wt %) | 0.00 | 0.38 | 0.76 | 1.17 | 1.56 | 2.03 |
| $CO_2$ (wt %) | 0.53 | 0.57 | 0.59 | 0.60 | 0.63 | 0.69 |
| Rate (lb/hr) | 192 | 191 | 191 | 191 | 191 | 192 |
| Part Density (lb/ft$^3$) | 2.73 | 2.62 | 2.55 | 2.70 | 2.70 | 2.73 |
| Measured Isopentane Loss (wt % 29 days) | 0.79 | 0.68 | 0.40 | 0.42 | 0.31 | 0.20 |

The foamed sheet produced in accordance with this invention is entirely suitable for thermoforming. One such example of a thermoforming process and apparatus is described in U.S. Pat. No. 4,485,059, which is incorporated herein by reference in its entirety. Employing this or other thermoforming techniques, a variety of useful articles, such as cartons, containers, cups, lids, bowls, plates, trays, etc., can be manufactured with great production efficiency and low cost. The foamed sheet manufactured with the blowing agent of the present invention is also suitable for preparation of insulation board, wherein the insulating boards are extruded and foamed to a predetermined size.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A blowing agent for foaming polystyrene consisting essentially of:

at least one low permeability compound, said low permeability compound having a permeability in said polystyrene lower than about $1 \times 10^{-12}$ cc(STP)(cm)/{(sec)(cm$^2$)(cmHg)};

at least one low volatility compound, said low volatility compound having a boiling point higher than about 23° C. and selected from the group consisting of acetone, acetone/water, methyl acetate, and mixtures thereof; and optionally, at least one high volatility compound, said high volatility compound having a boiling point lower than about 0° C.;

wherein said blowing agent comprises less than about 70 wt % of said low permeability compound.

2. The blowing agent of claim 1, including said at least one high volatility compound.

3. The blowing agent of claim 2, wherein said at least one low permeability compound is selected from the group consisting of isopentane, isobutane, and mixtures thereof, at least one of said low volatility compound is acetone and at least one of said high volatility compound being carbon dioxide.

4. The blowing agent of claim 2, wherein said at least one high volatility compound is selected from the group consisting of carbon dioxide, nitrogen, hydrofluorocarbons, ethane, and mixtures thereof.

5. The blowing agent of claim 1, wherein said at least one low permeability compound is selected from the group consisting of cyclopentane, isopentane, isobutane, 2-2 dimethyl butane, cyclohexane, and mixtures thereof.

6. The blowing agent of claim 1, wherein said blowing agent comprises less than 60 wt % of said low permeability compound.

7. The blowing agent of claim 6, wherein said blowing agent comprises less than 50 wt % of said low permeability compound.

8. The blowing agent of claim 1, wherein said low permeability compound is classified as a volatile organic compound (VOC) by the Environmental Protection Agency (EPA).

9. The blowing agent of claim 1, including said at least one high volatility compound, at least one of said high volatility compound is not classified as a volatile organic compound (VOC) by the Environmental Protection Agency (EPA).

10. The blowing agent of claim 1, wherein said blowing agent comprises at least about 10 wt % of said low volatility compound.

11. The blowing agent of claim 10, wherein said blowing agent comprises at least about 20 wt % of said low volatility compound.

12. A polystyrene foam structure prepared by the process comprising the steps of:
 (a) melting a mixture comprising a thermoplastic polymer;
 (b) dissolving an effective amount of blowing agent in the mixture of step (a), said blowing agent consisting essentially of at least one low permeability compound and at least one low volatility compound, said low permeability compound having a permeability in said polystyrene foam structure lower than about $1 \times 10^{-12}$ cc(STP)(cm)/{(sec)(cm$^2$)(cmHg)}, said low volatility compound having a boiling point higher than about 23° C. and selected from the group consisting of acetone, acetone/water, methyl acetate, and mixtures thereof and, optionally, at least one high volatility compound, said high volatility compound having a boiling point lower than about 0° C.;
 (c) forming an extrudate, said extrudate comprising from about 0.5 to about 3 wt % low permeability compound;
 (d) transferring the extrudate to an expansion zone; and
 (e) permitting the extrudate to expand in said expansion zone to produce said polystyrene foam structure, said polystyrene foam structure has a density from about 1 to about 15 lb/ft$^3$.

13. The polystyrene foam structure of claim 12, including said at least one high volatility compound.

14. The polystyrene foam structure of claim 13, wherein at least one of said low permeability compound is selected from the group consisting of isopentane, isobutane, and mixtures thereof, at least one of said low volatility compound is acetone and including said at least one high volatility compound, said at least one of said high volatility compound being carbon dioxide.

15. The polystyrene foam structure of claim 12, wherein said extrudate comprises from about 2 to about 10 wt % blowing agent.

16. The polystyrene foam structure of claim 15, wherein said extrudate comprises from about 3 to about 8 wt % blowing agent.

17. The polystyrene foam structure of claim 16, wherein said extrudate comprises from about 4 to about 6 wt % blowing agent.

18. The polystyrene foam structure of claim 12, wherein said extrudate comprises from about 0.5 to about 1.88 wt % of said low permeability compound.

19. The polystyrene foam structure of claim 12, wherein said extrudate comprises from about 1 to about 3 wt % of said low permeability compound.

20. The polystyrene foam structure of claim 12, wherein said extrudate comprises from about 0.25 to about 5 wt % said low volatility compound.

21. The polystyrene foam structure of claim 20, wherein said extrudate comprises from about 0.5 to about 3 wt % said low volatility compound.

22. The polystyrene foam structure of claim 13, wherein said extrudate comprises from about 0.25 to about 5 wt % said high volatility compound.

23. The polystyrene foam structure of claim 22, wherein said extrudate comprises from about 0.5 to about 3 wt % said high volatility compound.

24. The polystyrene foam structure of claim 12, wherein said at least one low permeability compound is selected from the group consisting of cyclopentane, isopentane, isobutane, 2-2 dimethyl butane, cyclohexane, and mixtures thereof.

25. The polystyrene foam structure of claim 13, wherein said at least one high volatility compound is selected from the group consisting of carbon dioxide, nitrogen, hydrofluorocarbons, ethane, and mixtures thereof.

26. A process for producing a polystyrene foam structure comprising the steps of:
 (a) melting a mixture comprising a thermoplastic polymer;
 (b) dissolving an effective amount of blowing agent in the mixture of step (a), said blowing agent consisting essentially of at least one low permeability compound and at least one low volatility compound, said low permeability compound having a permeability in said polystyrene foam structure lower than about $1 \times 10^{-12}$ cc(STP)(cm)/{ (sec)(cm$^2$)(cmHg)}, said low volatility compound being selected from the group consisting of acetone, acetone/water, methyl acetate, and mixtures thereof and, optionally, at least one high volatility compound, said high volatility compound having a boiling point lower than about 0° C.;
 (c) forming an extrudate, said extrudate comprising from about 0.5 to about 3 wt % low permeability compound;
 (d) transferring the extrudate to an expansion zone; and
 (e) permitting the extrudate to expand in said expansion zone to produce said polystyrene foam structure, said polystyrene foam structure having a density from about 1 to about 15 lb/ft$^3$.

27. The process of claim 26, including said at least one high volatility compound.

28. The process of claim 27, wherein said at least one low permeability compound is selected from the group consisting of isopentane, isobutane, and mixtures thereof, said at least one low volatility compound is acetone and said at least one high volatility compound is carbon dioxide.

29. The process of claim 26, wherein said at least one low permeability compound is selected from the group consisting of cyclopentane, isopentane, isobutane, 2-2 dimethyl butane, cyclohexane, and mixtures thereof.

30. The process of claim 27, wherein said at least one high volatility compound is selected from the group consisting of carbon dioxide, nitrogen, hydrofluorocarbons, ethane, and mixtures thereof.

31. The process of claim 26, wherein said extrudate comprises from about 0.5 to about 1.88 wt % low permeability compound.

32. The process of claim 26, wherein said extrudate comprises from about 0.25 to about 5 wt % low volatility compound.

33. The process of claim 32, wherein said extrudate comprises from about 0.5 to about 3 wt % low volatility compound.

34. The process of claim 27, wherein said extrudate comprises from about 0.25 to about 5 wt % high volatility compound.

35. The process of claim 34, wherein said extrudate comprises from about 0.5 to about 3 wt % high volatility compound.

36. The process of claim 26, wherein said extrudate comprises from about 2 to about 10 wt % blowing agent.

37. The process of claim 36, wherein said extrudate comprises from about 3 to about 8 wt % blowing agent.

38. The process of claim 37, wherein said extrudate comprises from about 4 to about 6 wt % blowing agent.

39. A blowing agent for foaming polystyrene consisting essentially of:
- at least one low permeability compound being selected from the group consisting cyclopentane, isopentane, isobutane, 2-2 dimethyl butane, cyclohexane, and mixtures thereof;
- at least one low volatility compound being selected from the group consisting of acetone, an acetone/water mixture, methyl acetate, and mixtures thereof; and
- optionally, at least one high volatility compound, said high volatility compound having a boiling point lower than about 0° C.;
- wherein said blowing agent comprises less than about 70 wt % low permeability compound.

40. The blowing agent of claim 39, including said at least one high volatility compound, said at least one high volatility compound being selected from the group consisting of carbon dioxide, nitrogen, hydrofluorocarbons, ethane, and mixtures thereof.

41. The blowing agent of claim 39, wherein said at least one low permeability compound is selected from a group consisting of isopentane, isobutane, and mixtures thereof, said at least one low volatility compound is acetone and includes said at least one high volatility compound, said at least one high volatility compound being carbon dioxide.

42. The blowing agent of claim 39, where in said blowing agent comprises less than about 60 wt % low permeability compound.

43. The blowing agent of claim 42, wherein said blowing agent comprises less than about 50 wt % low permeability compound.

44. The blowing agent of claim 39, wherein said blowing agent comprises greater than 15 wt % of said low volatility compound.

45. The blowing agent of claim 39, wherein said blowing agent comprises greater than 30 wt % of said low volatility compound.

46. A blowing agent for foaming polystyrene consisting essentially of:
- at least one low permeability compound, said low permeability compound having a permeability in said polystyrene lower than about $1 \times 10^{-12}$ cc(STP)(cm)/{(sec)(cm$^2$)(cmHg)};
- at least one low volatility compound, said low volatility compound having a boiling point higher than about 23° C. and selected from the group consisting of acetone, acetone/water, methyl acetate, and mixtures thereof; and
- optionally, at least one high volatility compound, said high volatility compound having a boiling point lower than about 0° C.;
- wherein said blowing agent comprises at least about 15 wt % of said low volatility compound.

47. The blowing agent of claim 46, wherein said blowing agent comprises greater than about 20 wt % of said low volatility compound.

48. The blowing agent of claim 47, wherein said blowing agent comprises greater than about 30 wt % of said low volatility compound.

49. The blowing agent of claim 46, including said at least one high volatility compound.

50. The blowing agent of claim 49, wherein said at least one low permeability compound is selected from the group consisting of isopentane, isobutane, and mixtures thereof, at least one of said low volatility compound is acetone and at least one of said high volatility compound being carbon dioxide.

51. The blowing agent of claim 49, wherein said at least one high volatility compound is selected from the group consisting of carbon dioxide, nitrogen, hydrofluorocarbons, ethane, and mixtures thereof.

52. The blowing agent of claim 46, wherein said at least one low permeability compound is selected from the group consisting of cyclopentane, isopentane, isobutane, 2-2 dimethyl butane, cyclohexane, and mixtures thereof.

53. The blowing agent of claim 46, wherein said blowing agent comprises less than about 70 wt % of said low permeability compound.

54. The blowing agent of claim 53, wherein said blowing agent comprises less than about 60 wt % of said low permeability compound.

* * * * *